United States Patent [19]

Yamamichi et al.

[11] E Re. 29,813

[45] Reissued Oct. 24, 1978

[54] PROCESS FOR THE REMOVAL OF SULFUR OXIDE FROM WASTE GAS

[75] Inventors: Yoshikazu Yamamichi; Jun-ichi Nagao, both of Okayama, Japan

[73] Assignee: The Dowa-Mining Co., Ltd., Tokyo, Japan

[21] Appl. No.: 753,917

[22] Filed: Dec. 23, 1976

Related U.S. Patent Documents

Reissue of:

[64] Patent No.: 3,943,230
Issued: Mar. 9, 1976
Appl. No.: 404,201
Filed: Oct. 9, 1973

[51] Int. Cl.[2] ..... C01B 17/00
[52] U.S. Cl. ..... 423/242; 423/166
[58] Field of Search ..... 423/242–244, 423/166

[56] References Cited

U.S. PATENT DOCUMENTS

| | | | |
|---|---|---|---|
| 2,311,202 | 2/1943 | Barwasser et al. | 423/242 |
| 2,926,999 | 3/1960 | Tarbutton et al. | 423/242 |
| 3,556,722 | 1/1971 | Owaki | 423/242 |

FOREIGN PATENT DOCUMENTS

| | | | |
|---|---|---|---|
| 445,711 | 4/1936 | United Kingdom | 423/242 |

*Primary Examiner*—Earl C. Thomas
*Assistant Examiner*—Gregory Heller
*Attorney, Agent, or Firm*—Toren, McGeady and Stanger

[57] ABSTRACT

A process, in which sulfur dioxide gas contained in waste gas is removed therefrom and collected as gypsum. In said process, the waste gas is subjected to a flow of detergent solution of basic aluminium sulfate so that the sulfur dioxide is absorbed into the solution. This solution, now containing the sulfur dioxide, is thereafter subjected to oxidation, resulting in a decrease in the basicity thereof. The solution is then neutralized by calcium carbonate or calcium hydroxide, whereby gypsum is precipitated in the solution and collected therefrom and whereby the crude content of the solution is recovered so that it may be used again as a detergent for the waste gas.

3 Claims, 2 Drawing Figures

PROCESS FOR THE REMOVAL OF SULFUR OXIDE FROM WASTE GAS

Matter enclosed in heavy brackets [ ] appears in the original patent but forms no part of this reissue specification; matter printed in italics indicates the additions made by reissue.

This invention relates to a new desulfurization process of stack or waste gas, by which sulfur dioxide gas within the stack gas is eliminated therefrom and converted into gypsum.

When various kind of desulfurization processes are classified to two categories, viz., the so-called "wet process" and "dry process", the present process belongs to the "wet process". As a scrubbing or detergent solution, a solution of basic aluminum sulfate of a suitable concentration is contacted countercurrently the flow of stack gas, and absorbs sulfur dioxide gas. The sulfite ion in the solution is oxidized into sulfate ion by blowing air succeedingly into an oxidizing tower containing the solution, which decreases the basicity of the basic aluminum sulfate solution. By the succeeding neutralization of said solution by means of calcium carbonate or calcium hydroxide, gypsum is precipitated from the solution, and simultaneously the crude content of basic aluminum sulfate solution is recovered and reused by recirculation as the scrubbing solution. In this case, the addition of a small amount of manganese salt into the scrubbing solution accelerates the oxidation of the sulfite ion to sulfate ion by oxygen within the stack gas in a absorbing tower simultaneously with the absorption of sulfur dioxide into the solution. By virtue of this oxidation within the absorbing tower, the necessity of the oxidation within the succeeding oxidation tower by air blowing is decreased which allows the use of a more compact oxidation tower. This feature is also a part of this invention.

It is well known that the basic aluminum sulfate solution absorbs much more sulfur dioxide gas at a lower temperature. This good absorption has been utilized to absorb dilute sulfur dioxide from a stack gas at a lower temperature and to desorb the gas at a high concentration at a high temperature.

For instance, the ICI process utilizes this characteristic of basic aluminum sulfate which absorbs sulfur dioxide into the solution at a lower temperature, and then desorbs it as high concentration of $SO_2$ at higher temperature, which is then fed to adjacent sulfuric acid plants as crude gas. Such plants as mentioned above were operated for some years in Japan and England at about 40 years ago. As mentioned above, the good $SO_2$ absorbing ability of basic aluminum sulfate solution is well known. Our invention partly utilizes this fact and relates to a novel combination to make the $SO_2$ into gypsum crystals.

Figure 1:
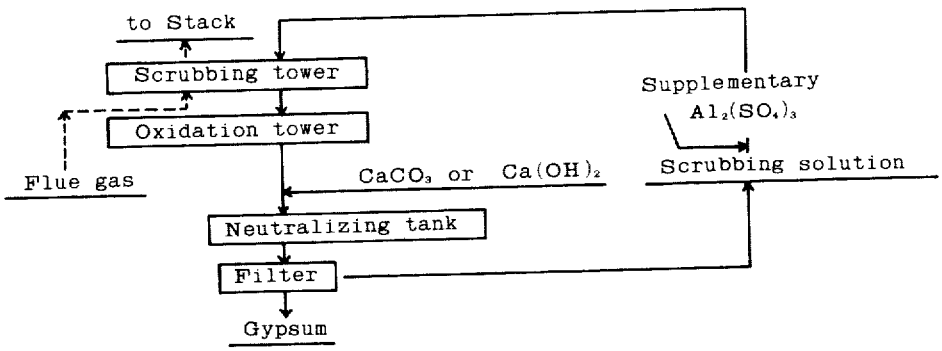
FIG. 1 is a flowsheet of the desulfurization process of this invention.

The process flowsheet of this invention is shown in FIG. 1. Basic aluminum sulfate solution as $SO_2$ absorbent is made up from aluminum sulfate solution by adding powdery calcium carbonate, and fixing the sulfate ion as precipitated gypsum. One example of a suitable concentration is $Al_2O_3$ 5g/100cm$^3$, $(Al_2O_3)$: $(SO_3)$ = 10 :16 by molar ratio. Of course, the aluminum concentration and basicity of the scrubbing solution depend on the gas condition. In most cases 0.05 - 1 mol/l aluminum sulfate concentration and 0–60% basicity are used in the scrubbing solution.

This scrubbing solution is contacted countercurrently with dilute sulfur dioxide gas within an absorbing tower, and absorbs $SO_2$ as described in the following Eq. (1), resulting in the production of aluminum sulfite within the solution. And then, in the succeeding oxidation step the scrubbing solution is oxidized by air blowing as described in the following Eq. (2).

$$Al_2(SO_4)_3Al_2O_3 + 3SO_2 \rightarrow Al_2(SO_4)_3 + Al_2(SO_3)_2 \qquad \text{Eq. (1)}$$

$$Al_2(SO_3)_3 + 3/2\ O_2 \rightarrow Al_2(SO_4)_3 \qquad \text{Eq. (2)}$$

In this case, a small amount of manganese salt addition results in the simultaneous oxidation of the sulfite ion within the absorbing tower with aid of the manganese catalytic action, and lessens the necessity of the oxidation by air blowing in the succeeding oxidation step. Usually, the added amount of manganese salt is chosen to be about 20 g/l.

After the oxidation, the solution is neutralized by the addition of calcium carbonate or calcium hydroxide, and is converted to precipitated gypsum, reviving the crude composition of the scrubbing solution with a suitable basicity of aluminum sulfate for recirculation, as shown in the following Eq. (3).

$$2Al_2(SO_4)_3 + 3CaCO_3 \rightarrow Al_2(SO_4)_3.Al_2O_3 + 3CaSO_4.2H_2O + 3CO_2 \qquad \text{Eq. (3)}$$

As mentioned above, this novel invention is summarized as follows: With the combination of superior sulfur dioxide absorbing ability of the basic aluminum sulfate aqueous solution, the sulfur dioxide within stack gas is absorbed into the scrubbing solution, and oxidized into basic aluminum sulfate, and then converted into precipitated gypsum by neutralization with calcium carbonate or calcium hydroxide, thereby renewing with crude composition of the scrubbing solution for recirculation with a suitable basicity of aluminum sulfate solution.

Moreover, the addition of a small amount of manganese salt to the basic aluminum sulfate solution produces an oxidation reaction in the absorbing tower by the catalytic action of the manganese ion, and lessens the necessity of oxidation by air blowing within the oxidation tower. This can result in making the oxidation unnecessary or at least allow it to be reduced in size supplemental characteristics of this invention.

Figure 2:
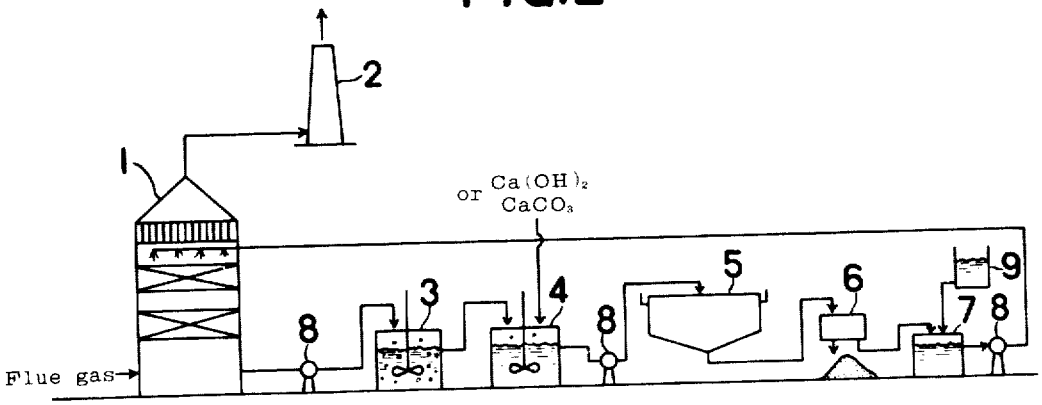
FIG. 2 is a schematic diagram of the present invention.

FIG. 2 shows an engineering flowsheet of the present process. Stack gas containing sulfur dioxide flows into a scrubbing tower (1), and is contacted countercurrently with the scrubbing solution having basic aluminum sulfate and a manganese salt dissolved therein. Sulfur dioxide gas is absorbed into the solution as aluminum sulfate and aluminum sulfite. The scrubbing solution is then oxidized by air blowing within an oxidation tower (3) for converting the sulfite ion into sulfate ion, and is neutralized within a neutralizing tank (4) by calcium carbonate and calcium hydroxide, for producing precipitated gypsum crystal and renewing the crude composition of the scrubbing solution for recirculation. The concentration of basic aluminum sulfate within the scrubbing solutions is suitably chosen from a wide range of basicity values and aluminum concentrations according to the condition of stack gas. In most cases, 0.05–1 mol/l aluminum sulfate concentration and 0–60% basicity are the conditions of the scrubbing solution. As noted above, a small amount of manganese salt is added into the scrubbing solution. As higher manganese salt addition results in greater catalytic oxidation action, a suitable manganese concentration is chosen depending on each condition. Usually 20 g/l of manganese concentration is regarded as suitable. The oxidation reaction occurs both within the scrubbing tower and the oxidation tower, but almost all of the oxidation reaction occurs within the oxidation tower when no manganese salt is added.

EXAMPLE 1

Stack gas with 1.5% $SO_2$ concentration is passed at the speed of 15 l/min into a packed scrubbing tower with a packed height of 30 cm and diameter of 5 cm. Scrubbing solution with concentration of $Al_2(SO_4)_3.Al_2O_3$ 270 g/l and basicity of 20% is sprayed in counterflow with a feed rate of 100 $cm^3$/min. and absorbs $SO_2$ from the stack gas, and then is oxidized within the oxidation tank by air blowing, and neutralized by calcium carbonate to precipitate gypsum crystal which are filtered by centrifugal separator. As the filtrate has been neutralized to the basicity similar to the crude scrubbing solution. The filtrate is reused as the recycling scrubbing solution. The result of continuous operation for 8 hours shows an average $SO_2$ absorbing ratio of 87% and produces superior quality gypsum crystal. Analysis of gypsum obtained: CaO-31.84%, $SO_3$-46.60%, Al-0.07%, Mn-Tr.

EXAMPLE 2

With the same equipment and the same concentration of scrubbing solution as Example 1, stack gas with 1.5% $SO_2$ is passed through the tower at a feed rate of 15 l/min, and contacted with the scrubbing solution flowing downward at the feed rate of 200 $cm^3$/min. The result of 9 hours' continueous operation shows an average $SO_2$ absorbing ratio of 95.5%, and produces a superior quality gypsum crystal. Analysis of gypsum obtained: CaO-32.80%, $SO_3$-46.65%, Al-0.05%.

EXAMPLE 3

With the same equipment as described above, at a feed rate of 15 l/min, stack gas with 0.5% $SO_2$ content is washed with the same content of scrubbing solution flowing with a feed rate of 100 $cm^3$/min. The result of 9 hours' continueous operation shows an average $SO_2$ absorbing ratio of 95.5%, and produces superior quality gypsum crystal. Analysis of gypsum obtained: CaO-32.34%, $SO_3$-46.43%, Al-0.05%.

EXAMPLE 4

With the same equipment as described above, at a feed rate of 15 l/min. stack as with 0.5% $SO_2$ content is scrubbed by a scrubbing solution flowing with a feed rate of 100 $cm^3$/min. which contains 270 g/l of $Al_2(SO_4)_3.Al_2O_3$ and a basicity of 20% and Example 4 also containing 20 g/l of $MnSO_4$. The result of 8 hours continuous operation shows an average $SO_2$ absorbing ratio of 96.0%, and an oxidation ratio of 50.0% within the absorbing packed tower.

With oxidation by air blowing within the succeeding oxidation tower, the sulfite ion is completely oxidized into sulfate ion. The time required for this oxidation is about half of the time required for the oxidation without $MnSO_4$. The solution is then neutralized within the neutralizing tank by calcium carbonate to convert the sulfate ion into precipitated gypsum, and filtrated by a centrifugal separator. After the filtrate is neutralized to the same basicity of the crude scrubbing solution, the filtrate is circulated again as a scrubbing solution.

EXAMPLE 5

3,500 $Nm^3$/Hr stack gas with 0.65% $SO_2$ is contacted countercurrently with 0.3 mol/l of basic aluminum sulfate solution flowing downward at a feed rate of 20 $m^3M$, controlling the basicity by neutralization of calcium carbonate for recirculation. The average $SO_2$ absorbing ratio has over 90%, and superior quality of gypsum was obtained.

What is claimed is:

1. A process for removing sulfur oxide from waste gas which comprises
   a. subjecting the waste gas to a countercurrent flow of an absorbent solution of 0.05 to 1 mol/liter of basic aluminum sulfate, said solution having a basicity of 0 to 60%, and containing *about* 20 g/l of a manganese salt to absorb the sulfur oxide into the solution and oxidize the absorbed sulfur oxide by means of the manganese salt; and
   b. blowing air through the absorbent solution from step a) to oxidize sulfite ion in the solution to sulfate ion;
   c. neutralizing the solution from step a) by adding calcium carbonate or calcium hydroxide whereby gypsum is precipitated; and
   d. separating the gypsum and reusing the solution as the absorbent solution in step a).

2. The process as claimed in claim 1, in which the precipitated crystalline gypsum is collected by filtration.

*3. A process for removing sulfur oxide from waste gas which comprises*
   *a. subjecting the waste gas to a countercurrent flow of an absorbent solution of 0.05 to 1 mol/liter of basic aluminum sulfate, said solution having a basicity of 0 to 60%, and containing an amount of a manganese salt sufficient to absorb the sulfur oxide into the solution and oxidize the absorbed sulfur oxide by means of the manganese salt; and*
   *b. blowing air through the absorbent solution from step a) to oxidize sulfite ion in the solution to sulfate ion;*
   *c. neutralizing the solution from step a) by adding calcium carbonate or calcium hydroxide whereby gypsum is precipitated; and*
   *d. separating the gypsum and reusing the solution as the absorbent solution in step a).*

* * * * *